Sept. 16, 1952 J. E. HAWKINS 2,611,024
SEISMIC SIGNAL AMPLIFYING SYSTEM
Filed Sept. 20, 1946
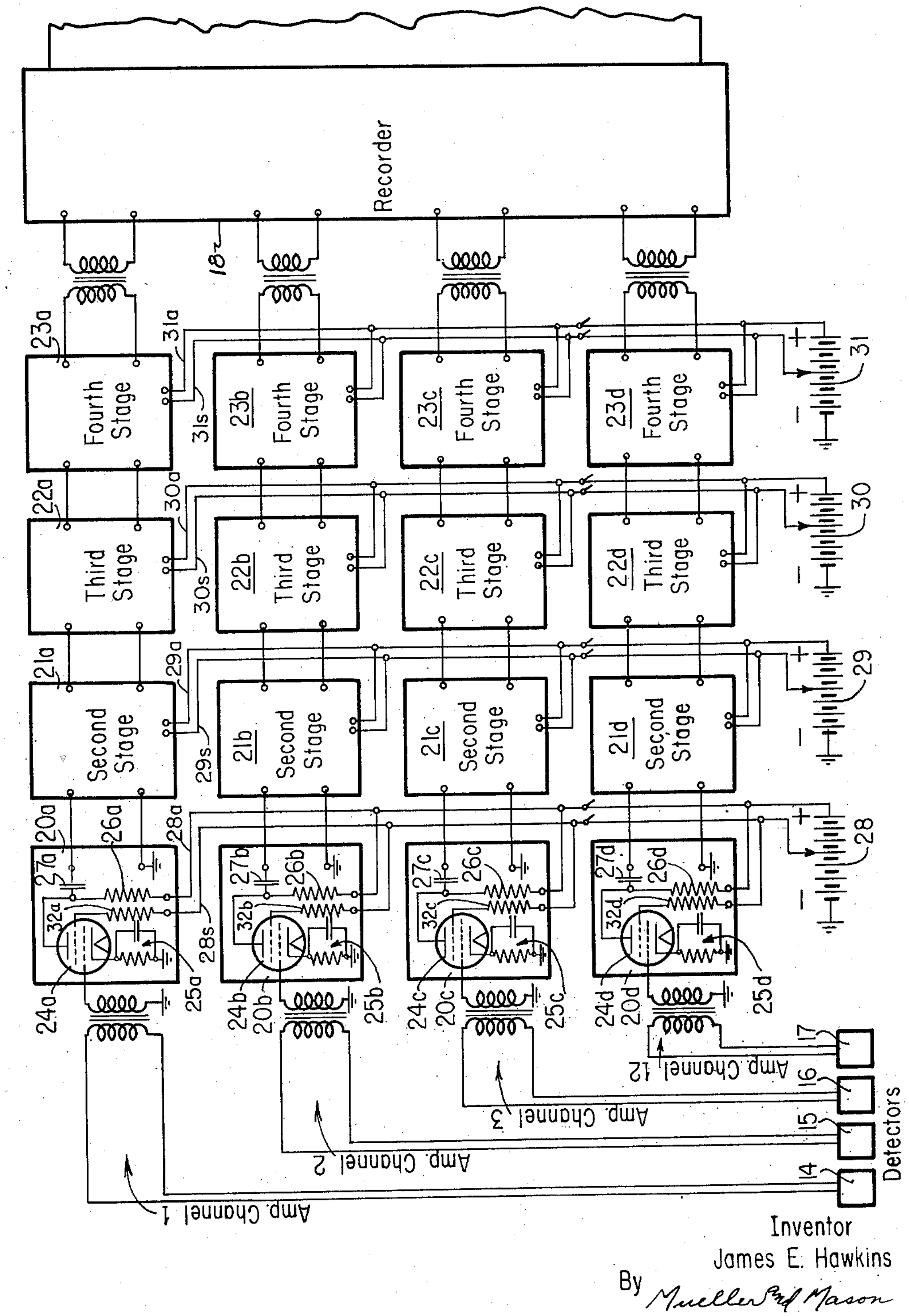
Inventor
James E. Hawkins
By Mueller and Mason
Attorneys Patented Sept. 16, 1952 2,611,024

UNITED STATES PATENT OFFICE 2,611,024

SEISMIC SIGNAL AMPLIFYING SYSTEM

James E. Hawkins, Tulsa, Okla., assignor to Seismograph Service Corporation, Tulsa, Okla., a corporation of Delaware Application September 20, 1946, Serial No. 698,343

2 Claims. (Cl. 177—352)

The present invention relates to seismic signal amplifying systems and more particularly to an improved arrangement for supplying anode currents and screen potentials to the electron discharge tubes of a multi-channel, multi-stage seismic signal amplifier.

In single channel, multi-stage audio frequency amplifiers operated from a common power supply, one of the problems involved is that of decoupling the anode and screen circuits of the various stages from each other to prevent interstage coupling through the power supply impedance. Decoupling is necessary in order to prevent variations in the supply voltage caused by changes in the anode current of the tubes in the second to last stages of the amplifier from being transferred to the first stage and amplified in this stage to in turn cause even greater variations in the following stages, eventually resulting in oscillation. It is commonly obtained by delivering anode current to each tube through a load resistor and a decoupling resistor and by by-passing the decoupling resistor and source for signal current flow by means of a condenser having a low impedance as compared with the combined impedance of the current source and decoupling resistor. In resistance coupled amplifiers, it is generally considered good design practice to maintain a ten to one ratio between the resistance of the anode or plate circuit resistor of each stage and the resistance of the decoupling resistor of the stage. It is also considered good design practice to use a by-pass condenser at each stage having an impedance approximately one tenth the combined impedance of the current source and decoupling resistor at the lowest frequency at which the amplifier is designed to operate. Thus in an amplifier designed to operate at frequencies as low as fifty cycles and employing at each stage a load resistor of 50,000 ohms and a decoupling resistor of 5,000 ohms, the by-pass condensers should each have a capacitance of 6.05 microfarads.

In seismic signal amplifying systems, the above problem is complicated by two additional requirements. First, the amplifier response must be extended to much lower frequencies, i. e., frequencies as low as one cycle per second in amplifiers designed for refraction work, which means that using the load and decoupling resistor constants given above, a by-pass condenser of over 300 microfarads is required. The second requirement of the system is that several signal channels be provided (typical systems include twelve and twenty-four channels) and that the tubes of the several channels be connected to one current source, thereby to reduce the number of multiple voltage current sources (usually batteries) required, to conserve the batteries and to insure the same overall signal gain in the various channels. This gives rise to the problem of eliminating crossfeed between the various channels. Specifically, the connection of the tubes of a number of channels to the same current supply source permits a signal in one channel to couple through the internal impedance of the source to the other channels thus causing variations in the anode currents of the first stages of the other channels, which are then amplified by the succeeding stages of the other channels to appear at the output sides thereof as "crossfeed." Even though the decoupling circuits are effective to prevent oscillation due to interstage coupling, they may be entirely inadequate to prevent crossfeed from occurring. Thus while the gain in any feedback loop of an amplifier channel must be greater than unity and the phase relationships must be correct in order for oscillation to take place, crossfeeding into other channels may still take place even though these conditions are not present. Crossfeed between channels is considered undesirable in most systems when the ratio reaches 40 to 60 db below the originating signal. It is known that undesired crossfeed will occur from channel to channel regardless of the phase, when the gain of the channel into which crossfeeding is taking place, less the loss in the decoupling networks, is greater than −40 to −60 db. Stated otherwise, the signal which is transferred from one channel to another should be maintained at a value 40 to 60 db below the signal level at the same relative stage in the other channel if objectionable crossfeed is to be prevented. To achieve this end, it is necessary to use condensers and resistors considerably larger than would be necessary to prevent oscillation in a single channel amplifier. However, small physical size and light weight are essential in seismic signal amplifiers due to the portable nature of seismic surveying work. Moreover, condensers having capacitance values greater than ten microfarads at voltage ratings of not less than 135 volts are of necessity so large in size as to render use thereof in seismic signal amplifiers impractical. The alternative of employing separate current sources (batteries) for each stage is likewise impractical due to the large number of batteries required. Thus the problem of supplying anode currents and screen potentials to the tubes of a multi-stage, multi-channel seismic signal amplifier designed to operate at very low frequencies without introducing objectionable inter-channel crossfeed and oscillation within channels is very troublesome.

It is an object of the present invention, therefore, to provide improved power supply facilities for a seismic signal amplifying system, which facilities are so arranged that the problems outlined above are largely obviated.

More specifically, it is an object of the present invention to provide an improved power supply arrangement for a seismic signal amplifying system, which includes only a small number of current supply sources, completely obviates the problem of interstage coupling within channels and also minimizes crossfeed between channels.

The invention, both as to its organization and method of operation, together with further objects and advantages thereof, will best be understood by reference to the following specification taken in connection with the accompanying drawing in which the single figure illustrates the invention in its embodiment in a seismic surveying system.

Referring now to the drawing, the present improved seismic signal amplifying system is there illustrated in its embodiment in a seismic surveying system which comprises twelve amplifying channels 1, 2, 3—12, for transmitting detected seismic signals from twelve geophones or signal detectors 14, 15, 16—17 in amplified form to twelve of the recording elements of a seismic signal recorder 18. Each of the twelve amplifying channels is of the multi-stage variety, the individual stages of which are of identical circuit arrangement. Thus the amplifying channel 1 is illustrated as comprising four stages 20*a*, 21*a*, 22*a*, and 23*a*, the first of which has its input terminals transformer coupled to the geophone 14 and the last of which has its output terminals transformer coupled to the driving coil of one of the galvanometer elements embodied in the recorder 18. As shown, the first stage 20*a* of the amplifying channel 1 comprises electron discharge tube 24*a* of the well known tetrode type having its input electrodes, i. e., its control grid and cathode, connected to the secondary winding of the channel input transformer through a conventional resistance capacitance cathode biasing network 25*a*. The output electrodes of this tube, i. e., the anode and cathode thereof, are coupled through a coupling condenser 27*a* to the input electrodes of the tube provided at the second amplifier stage 21*a* in the channel 1. As indicated above, the arrangement of the amplifier channels 2, 3—12 is identical with the amplifying channel 1 both from the standpoint of the number of stages provided and the circuit arrangement of the individual stages respectively embodied therein. Accordingly, corresponding components of the illustrated channels 2, 3 and 12 have been identified by the same reference numerals as are used to identify the components of the channel 1, distinguished only by the addition of subscripts *a*, *b*, *c* and *d* as between the components of the different channels. The signal detectors 14, 15, 16—17 and the seismic signal recorder 18 may be of any desired commercial construction.

In general, the mode of operation of the system, as thus far described, will be readily understood by those skilled in the art. Briefly, however, seismic signals generated through detonation of an explosive charge at a point distant from the array of detectors 14, 15—17 and as transmitted through the earth both directly and through reflection and refraction from buried strata interfaces and the like, are picked up by the detectors 14, 15, 16—17, converted into corresponding electrical signals through the operation of these detectors, amplified through the respective amplifying channels 1, 2, 3—12 and impressed upon the respective associated driving coils of the galvanometer elements embodied in the recorder 18. If desired or necessary, automatic gain control facilities, preferably of the improved form described and claimed in copending application Serial No. 673,744, filed June 1, 1946, Hawkins and Cornett, now Patent #2,554,905, May 29, 1951, and assigned to the same assignee as the present invention, may be provided in association with the individual channels of the amplifying system for the purpose of maintaining the output signals impressed upon the driving coils of the galvanometer elements in the recorder 18 within the desired amplitude limits during translation and recording of the detected seismic wave trains.

In accordance with the present invention, the problems as outlined in the introductory portion of the specification have been substantially completely obviated by providing current sources in the form of batteries 28, 29, 30 and 31 individual to the four stages of the amplifying system for supplying anode currents and screen electrode potentials to the electron discharge tubes respectively embodied in the different stages of the system, and by only using load resistors (no bypass condensers) individual to the anode circuits of the various tubes, thereby to minimize crossfeed between the various channels. Thus the positive terminal of the battery 28 is conductively connected by means of a common conductor 28*a* and individual load resistors 26*a*, 26*b*, 26*c* and 26*d*, respectively, to the anodes of the tubes 24*a*, 24*b*, 24*c* and 24*d* to supply anode currents to these tubes. This terminal of the battery 28 is similarly connected by way of the conductor 28*a* to supply anode currents to the tubes of the eight other first amplifier stages respectively embodied in the eight other channels of the system. Operating potentials are supplied to the screen electrodes of the tubes respectively embodied in the twelve first amplifying stages of the system from a voltage tap along the source 28 over a common conductor 28*s* and screen resistors 32*a*, 32*b*, 32*c* and 32*d*, respectively, each having a resistance value of from 50,000 ohms to 100,000 ohms. Identical circuit arrangements respectively comprising the conductors 29*a* and 29*s*, 30*a* and 30*s* and 31*a* and 31*s*, are used to supply anode currents and screen potentials to the tubes respectively provided at the second, third and fourth stages of the various channels of the amplifying system from the current sources 29, 30 and 31, respectively. Thus it will be noted that while the system comprises a total of forty-eight amplifier stages, only four separate current sources are required to supply the necessary anode currents and screen potentials. Preferably the four current sources 28, 29, 30 and 31 are in the form of sectionalized "B" batteries having very low internal impedances. For example, each of the four sources 28, 29, 30 and 31 may comprise three series connected 45 volt "B" batteries of the commercial type No. 21,308, manufactured by the Burgess Battery Company. Each battery of this type has an internal impedance of only 10 ohms, which impedance is substantially purely resistive. If this arrangement is used, the source 28 has an overall voltage of 135 volts and an internal resistive impedance of 30 ohms. Conveniently, the screen supply conductor 28s may be connected to the positive terminal of the second battery to provide a screen potential of 90 volts.

By providing current sources on a per stage basis in the manner just described, no coupling through the power supply circuits exists between succeeding stages of the respective channels. Thus since separate sources 28 and 29 are used at the first and second stages of the system, respectively, no coupling can exist through the power supply circuits between the stages 20a and 21a of the channel 1, for example. As a consequence, the problem of inter-stage coupling through the power supply circuits between the several stages of each channel is completely obviated with the result that intrachannel oscillation due to coupling through the supply source cannot possibly occur. Further, by segregation the power supply circuits on the basis of groups of amplifying stages operating at the same general amplification level, the level of signal crossfeed between channels is reduced to the ratio of the internal source impedance to the plate or anode impedance of a single tube. Thus if:

C. F. ratio=the ratio of crossfeed to normal signal.

$R_i$=internal resistance of the source 28.

$R'$=plate or anode resistance of each tube.

$$\text{C. F. ratio}=\frac{R_i}{R'}$$

Further if a load resistor 26a having a resistance value of 50,000 ohms is used in conjunction with a current source 28 of the character described above having an internal resistive impedance of 30 ohms, the crossfeed ratio becomes:

$$\text{C. F. ratio}=\frac{R_i}{R'}=\frac{30}{50,000}=0.0006=64\text{ db}$$

As indicated previously, this value represents entirely adequate suppression of signal crossfeed between channels. Moreover, since there is no additional amplification of the crossfeed signal over the normal signal, i. e., since the ratio of the normal signal level to the crossfeed signal level remains the same at each stage of a channel following the point of crossfeed, decoupling to compensate for such amplification is not necessary. This is in contrast with a conventional system wherein a single current source is used for all stages. Further, since by-pass condensers are not required in the decoupling circuits, due to the stage-by-stage separation of the current sources, and since the internal impedances of the sources are essentially resistive, the decoupling ratio remains the same at all frequencies within the operating frequency range of the amplifying system. Also, the crossfeed ratio remains the same at all stages of the system regardless of the stage gain or the amplification level at which the stage is operating. A further feature of the described arrangement resides in the fact that the plate resistances and tube impedances of tubes 24a, 24b, 24c and 24d are effectively in parallel with the internal resistance of the source 28. This means that the greater the number of channels, the greater the number of impedance paths effectively paralleling the source 28 and hence the lower the effective internal impedance of this source. As a consequence, increasing the number of channels has the effect of reducing the ratio of crossfeed signal level to normal signal level at each stage of the amplifying system.

As a modification of the described power supply system, each current source may be used to supply anode currents and screen potentials to the tubes of two adjacent sets of stages in the several channels of the amplifying system. To this end, the conductors 28a and 28s may be connected respectively to the conductors 29a and 29s and the current source 29 omitted. Similarly, the conductors 30a and 30s may be connected to the conductors 31a and 31s and the current source 31 omitted. With this arrangement, feed-back from the second stage of each channel to the first stage of the same channel through the impedance of the source 28 is obviously degenerative since the anode currents supplied to the tubes of these two stages are in phase opposition. Hence, the feed-back cannot result in intrachannel oscillation and the desired condition of stability is fulfilled. However, use of the current source 28 to supply the adjacent first and second stages of the several channels does appreciably increase the crossfeed ratio. In certain cases, the increase is not so appreciable as to become intolerable and hence may be tolerated in the interests of further reducing the number of current sources required. Under no circumstances, however, is it desirable to use a single current source to supply the tubes of non-adjacent stages of the system since to do so introduces the problem of instability occasioned by oscillation attributable to feed-back. Further, in no case is it desirable to use a single current source to supply more than two stages of the several channels in the system since this has the effect of increasing the crossfeed ratio to an intolerable value.

From the above explanation it will be understood that the present invention affords a complete, practical and simple solution to the various problems outlined in the introductory portion of the specification. Moreover, this solution is achieved without using non-standard components of special design and by actually eliminating certain of the components (the by-pass condensers) ordinarily essential to satisfactory operation of low frequency amplifying systems of the character described.

While two embodiments of the invention have been described, it will be understood that various modifications may be made therein which are within the true spirit and scope of the invention as defined in the appended claims.

I claim:

1. In a multi-channel seismic signal translating system, a plurality of seismic signal detectors, a seismic signal recorder, a plurality of channels for separately transmitting seismic signals from different ones of said detectors to said recorder, a plurality of amplifier stages in each of said channels, each of said amplifier stages including at least one amplifier tube provided with an anode, a plurality of sources of anode current individually corresponding to the different stages of said system, conductive circuit means including impedance elements individual to said tubes for connecting each source to deliver anode currents only to the tubes of the respective corresponding stages of all of said channels, the ratio of the effective shunt impedance of impedance elements of corresponding stages to the internal resistive impedance of the corresponding current source being of sufficient magnitude substantially to suppress signal cross feed between channels.

2. In a multi-channel seismic signal translating system, a plurality of seismic signal detectors, a seismic signal recorder, a plurality of channels for separately transmitting seismic signals from different ones of said detectors to said recorder, a plurality of amplifier stages in each of said channels, each of said amplifier stages including at least one amplifier tube provided with an anode, a plurality of sources of anode current individually corresponding to the different stages of said system, conductive circuit means including impedance elements individual to said tubes for connecting each source to deliver anode currents only to the tubes of the respective corresponding stages of all of said channels, the ratio of the effective shunt impedance of impedance elements of corresponding stages to the internal resistive impedance of the corresponding current source being substantially the same for each of said stages and of sufficient magnitude substantially to suppress signal cross feed between channels.

JAMES E. HAWKINS.

REFERENCES CITED

The following references are of record in the file of this patent:

UNITED STATES PATENTS

| Number | Name | Date |
|---|---|---|
| 1,635,959 | Round | July 12, 1927 |
| 1,822,922 | Culver | Sept. 15, 1931 |
| 2,007,624 | Von Ardenne | July 9, 1935 |
| 2,251,151 | Mistro | July 29, 1941 |
| 2,287,942 | Nelson | June 30, 1942 |
| 2,383,571 | Shook | Aug. 28, 1945 |